Patented June 24, 1930

1,766,656

UNITED STATES PATENT OFFICE

KARL KUNTZE, ARNOLD HALLER, AND ERNST WIRZ, OF BADEN, SWITZERLAND, ASSIGNORS TO AKTIENGESELLSCHAFT BROWN BOVERI & CIE., OF BADEN, SWITZERLAND, A JOINT-STOCK COMPANY OF SWITZERLAND

ELECTRIC CONTROL APPARATUS

Application filed April 1, 1927, Serial No. 180,299, and in Germany April 3, 1926.

This invention relates to electric controllers, and it has particular relation to controllers used in electric railway vehicles, and the like, for establishing various operating connections between the electric motors propelling the vehicle and the supply line. Some of the features of the invention are, however, of much wider application.

Among the objects of the invention is a controller of the foregoing character organized to permit handling of large currents and establishing large numbers of circuit combinations with a structure of small size, and having its several parts arranged to be readily accessible, positive in operation, and subject to little wear; a special compensator for eliminating unevenness in resistance to the movement of the manually operated handle actuating the controller in order to facilitate the work of the operator; a special contactor switch for the controller suitable for mounting in a corner of the controller casing and combining simplicity with high current interrupting capacity; and other features which will appear from the following description of an exemplification of the invention.

In the accompanying drawings.

The switching on and off of the motors that have to be connected in various combinations, and reversed or stated up at frequent intervals, is usually carried on by means of a controller that is manually operated by the person directing the operation of the apparatus in question. Depending on the severity of the operating conditions, various types of controllers are used. They may, in general, be grouped in three classes, namely, drum controllers with ring contacts for medium service, controllers with cam-operated hammer contacts for heavy service, or contactor control gears comprising electromagnetically operated switches energized and de-energized by a master controller, for extremely frequent starting and stopping under high duty.

The present invention is particularly directed to controllers of the second type, namely, those having cam-operated hammer contacts, but some of the features of the invention are not restricted to this service or application.

The general arrangement of a controller of such type embodying the invention appears from Figs. 1 to 5.

Figure 1:
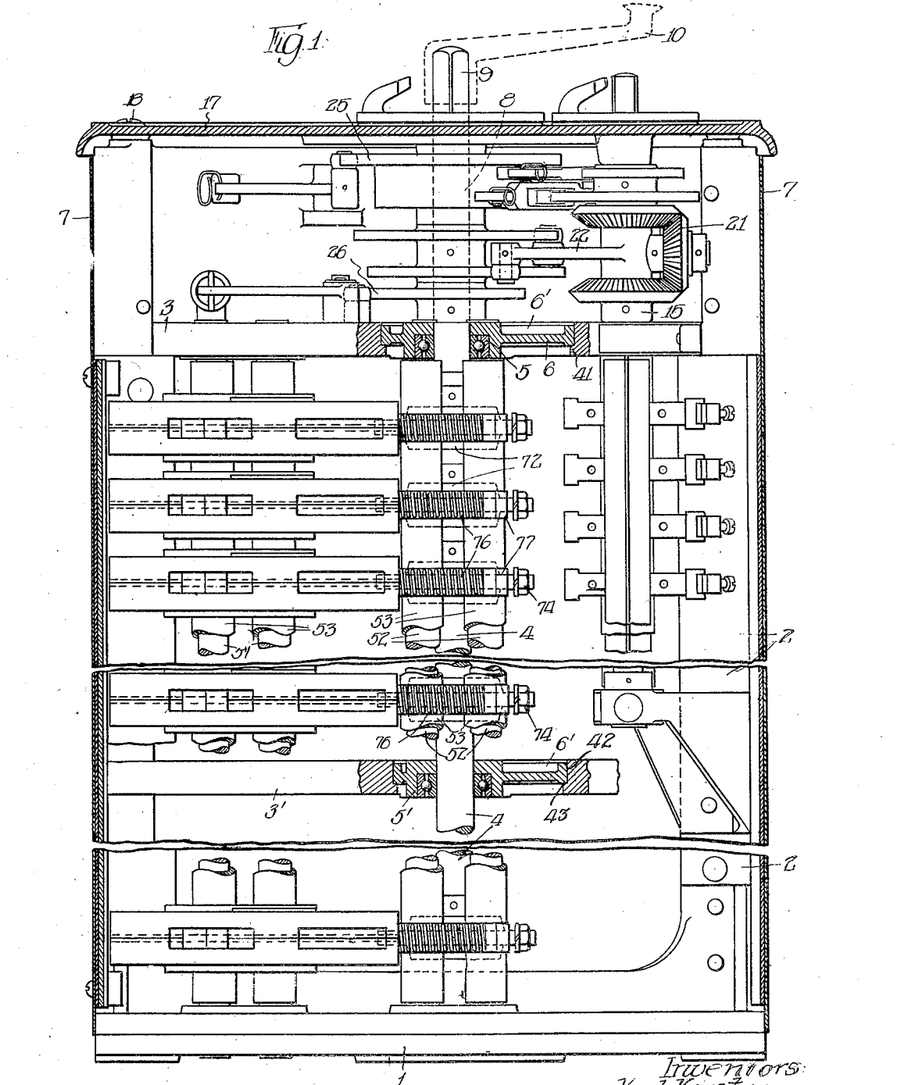
Fig. 1 is a vertical, partially sectional view of the interior of a controller constructed according to the invention.

Secured to the rear corners of a heavy iron base 1 there are two vertical, angle, iron members 2 supporting at their upper ends a partition wall or shelf 3 disposed parallel above the base 1. A main control shaft or spindle 4 has its lower end journaled in the base 1 and its upper end supported in a bearing 5 that is held in a bearing supporting collar 6 movably mounted within a suitable opening 6' in the partition wall 3. The partition wall or shelf 3 has upwardly extending side walls 7, Fig. 5, that form a kind of an open chamber wherein are mounted the mechanical parts of the controller described hereinafter. The controller shaft or spindle has an extension 8 projecting above the upper bearing 6 and terminating at its upper end in a squared portion 9 for receiving a handle 10 by means of which the shaft is rotated to operate the controller. A metal sheet 11 back of and between the angle irons 2 forms the rear wall of the controller.

A removable sheet metal cover 12 serves to inclose the front and the sides of the controller and may be clamped to the rear wall by means of suitably pivoted bolts 13. A second auxiliary control shaft 15 is mounted adjacent to the main control shaft 4 to perform auxiliary control operations, such as reversing, but the details of the auxiliary control arrangement are not part of the present invention except as referred to hereinafter. The top of the chamber formed by the rear wall 11, the base plate 1 and the removable front cover 12, is enclosed by a cover plate 17 that may be readily removed by loosening screws 18 which hold said cover plate clamped to the side walls 7 of the shelf 5. The plate is provided with suitable perforations to accommodate the squared ends of the two shafts projecting above the same.

In the box-like compartment of the controller chamber between the partition wall 3 and the top cover 17, the second control shaft 15 has mounted thereon various operating mechanisms 21 and interlocking mechanisms 22 for interlocking the two shafts so that one shaft may be moved only when the other shaft is in a predetermined position. The portion 8 of the main shaft 4, extending through said upper compartment, carries, in addition to members of said interlocking mechanisms 22, a star or notch wheel 25 clearly shown in Fig. 5, and underneath the star wheel a compensating cam 26 having a peculiarly shaped cam surface referred to hereinafter.

Figure 5:
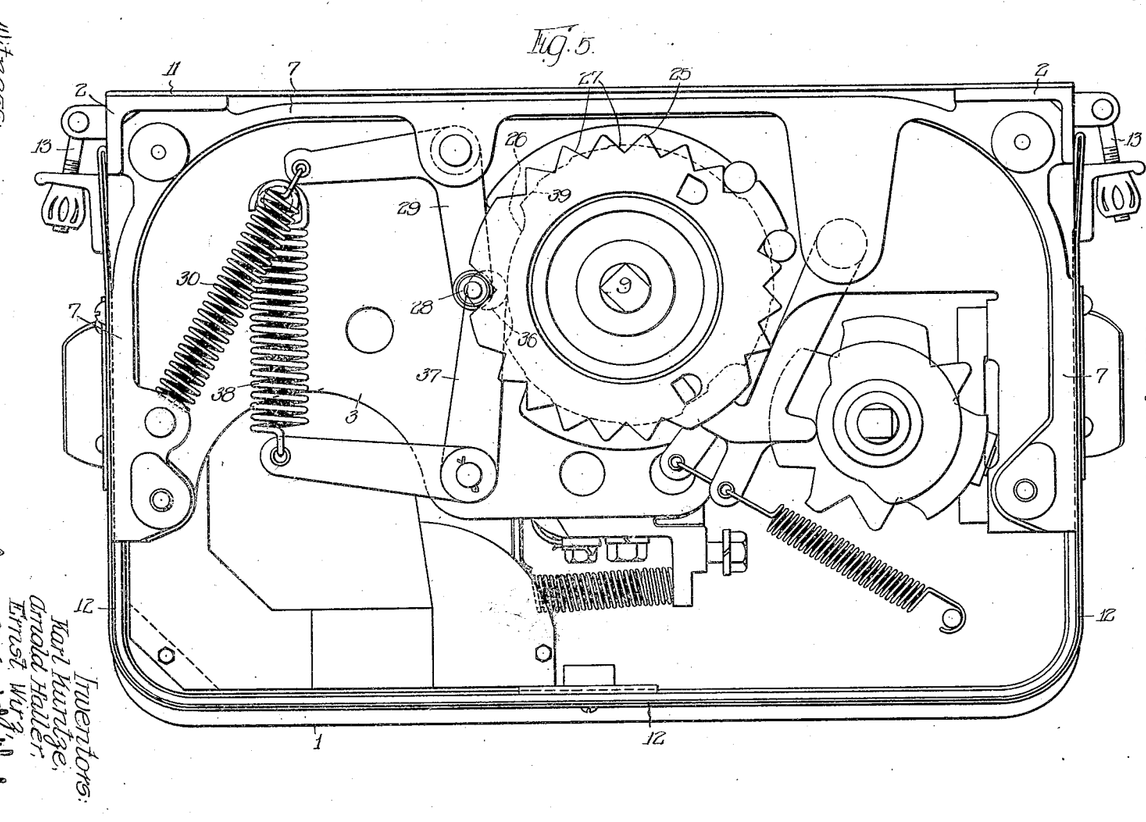
Fig. 5 is a top elevational view of the upper end of the controller with the cover plate removed.

The star or notch wheel 25 has notches 27 disposed along the periphery for cooperation with a detent roller 28 pressed against the periphery of the star wheel by means of a lever 29 that is actuated by a coil spring 30. When the detent roller 28 is pressed into any one of the notches 27, a certain pressure must be exerted on the operating handle in order to cause the roller to move out from the notch and permit the rotation of the shaft to another angular position. When the shaft reaches a position wherein the next notch is opposite the roller 28, the latter is again pressed into the notch and exertion of pressure is again required to move the shaft to a further position. The star wheel with the associated detent roller 28 and mechanisms for actuating the same thus serve to accentuate definite angular positions of the shaft in the course of rotation thereof by the operator, without interfering with such operation. The positions of the notches correspond to the various control positions into which the control shaft is intended to be brought when operating the controller. By suitably shaping the notches, the individual control positions may be more or less accentuated, as desired.

Figure 6:
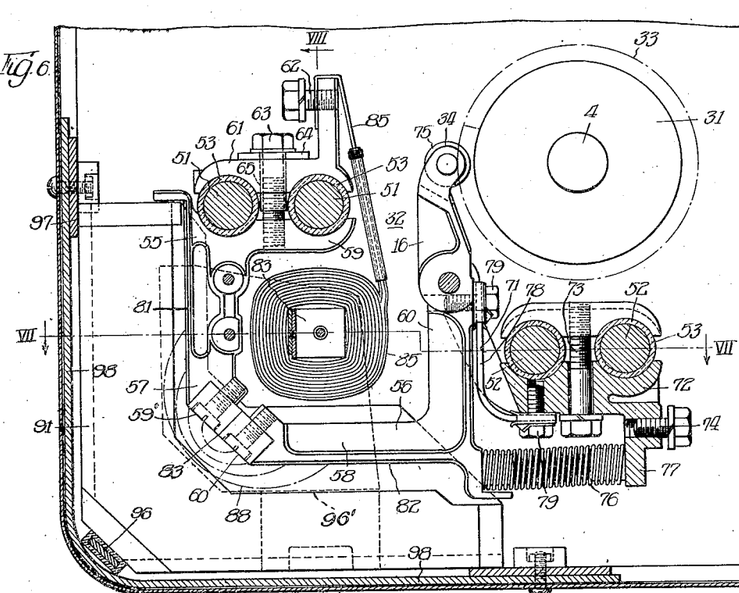
Fig. 6 is a top elevational view of a switch unit utilized in the controller.

While all purely mechanical parts of the controller are mounted in the upper compartment above the shelf 3, all live electrical parts of the controller are confined in the lower compartment. Within this compartment the main shaft 4 has mounted thereon a plurality of switching cams 31, Fig. 6, arranged to operate a plurality of contactor switches 32, vertically aligned adjacent to said switching cams in a corner of the casing. The switching cams have substantially circular-raised cam surfaces 33, engaging cam rollers 34 on the switches 32 for opening the switches, the switches being closed when the cam rollers 34 are opposite a depressed portion of the cam surface.

In order to secure positive operation of the controller, the switches 32 are held in closed position by a substantial force, and accordingly, a very definite opposing force must be exerted by the cam when opening a switch. This force is supplied to the various cams through the shaft 4 and must, in turn, be applied to the shaft from the hand of the operator by means of the handle on top of the controller. In general, the raised cam surfaces of the individual cams have different angular extension and are angularly offset since the number of switches that are to be opened or closed in the individual positions of the controller will vary. Thus, in some positions, most of the switches will be open, and in other positions, most of the switches will be closed. In some positions only two of the switches will be open and in others five will be open, for instance. It is clear that under such conditions the force that must be exercised by the hand of the operator will vary from position to position, depending on the number of switches that are to be simultaneously actuated.

This irregular variation of the resistance offered to the movement of the controller has proven a serious defect in the controllers of the foregoing type as manufactured heretofore. In some instances, the operator, meeting a high resistance, would apply a large force to the handle. At the next step, the resistance offered to the movement of the handle would suddenly decrease, the large applied force causing the handle to be moved through several steps against the original intention of the operator. Furthermore, the irregular variations of the resistance opposing the movement of the handle would entirely obliterate the effect of the star wheel and the associated detent mechanism, making impossible this simple control of the accentuation of the individual steps in the controller movement.

Figure 4:
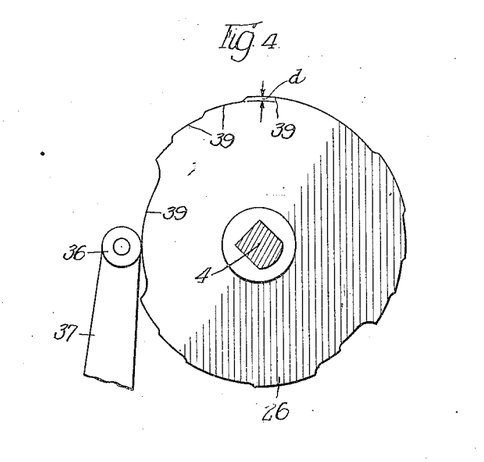
Fig. 4 is a top elevational view of the torque compensating cam on the main shaft of the controller with the associated mechanism.

In accordance with the present invention the foregoing defect is eliminated by the provision of a special compensating mechanism. This mechanism comprises the compensating cam 26, referred to hereinabove, cooperating with a friction member, in the form of a roller 36, engaging the surface of the compensating cam 26 and suitably pressed thereagainst, as by means of a compensating bell crank lever 37 that is held under tension by means of a compensating coil-spring 38. The action of the compensating roller 36 on the active surface of the compensating cam 26 is similar to the action of the switch rollers 34 when rolling on the raised portions of the switching cams 31. Accordingly, the compensating cam introduces an additional amount of resistance opposing the rotation of the control shaft 4, and by varying the amount of said resistance, which may be termed the compensating resistance, it is possible to make the total resistance offered to the movement of the shaft, by the switching cams, as well as by the compensating cam, stay practically constant throughout the entire range of the movement of the handle, or throughout such portions thereof as is desired.

The variations of the compensating resistance are secured by increasing or decreasing, respectively, the force with which the compensating roller 36 is pressed against the surface of the compensating cam. This force may be readily adjusted by varying the distances of the active portion of the periphery of the compensating cam from the center of rotation thereof. It is for this reason that the periphery of the compensating cam has the step-like shape, as shown in Fig. 4, being composed of a plurality of arc sections 39 of different curvature and spacing from the center of the cam. As the cam is rotated with the shaft 4, the compensating roller is pressed outwardly to a more or less extent, increasing the resistance to the movement of the cam when the roller engages an arc section that is further removed from the center, and decreasing said resistance when an arc section nearer the center is engaged by the roller.

Assuming, for instance, that the resistance offered to the movement of a switching cam is equivalent to a certain radial distance on the compensating cam, which for convenience may be designated as a compensating unit $d$, it is readily possible to determine the shape of the active surface of the compensating cam in order to secure the resistance compensation, as explained above. In general, the active cam surfaces of the individual switching cams 31 will be angularly displaced with respect to each other, and vary in lengths, so as to vary the number of switches that are simultaneously opened or closed at the individual steps of the controller movement.

Taking the case of a controller having 7 switching cams, arranged to hold simultaneously open one, or two, or three, or more of the switches, the compensating cam has its periphery composed of sections which vary in radial depth by a suitable number of compensating units corresponding to the number of switches that are simultaneously actuated while the particular portion of the periphery of the cam is in engagement with the compensating roller. In other words, starting with the most depressed portion of the periphery of the compensating cam, this portion of the periphery is arranged to engage the compensating roller while all the 7 switches are simultaneously actuated by their associated switching cams. If, at the next step of the controller only 5 switches, for instance, are actuated by their cams, the adjacent portion of the compensating cam periphery is radially farther than the last-mentioned portion of the periphery by a distance equal to two compensating units. If, in the next adjacent step only one switch is actuated, the corresponding portion of the periphery of the compensating cam is radially farther than the first mentioned portion of the periphery by a distance equal to 6 compensating units, and so forth.

In designing the compensating mechanism, consideration must be given to the changes of the force exercised by the spring, depending on the variations of its elongation, as well as on the variations of the magnitude of the force applied by the roller 36 against the surface of the compensating cam, depending on the different angular positions assumed by the lever that holds the compensating roller. These variations of the force with which the roller is pressed against the surface of the compensating cam may be suitably taken care of by varying the depth of the individual steps of the compensating cam surface. By suitably shaping the individual portions of the periphery of the cam, any desired characteristics may be imparted to the movement of the controller shaft independently of the character of the resistance offered to the action of the switching cams in closing or opening the individual switches.

It is only in a controller provided with a compensating mechanism, as described above, that full use is derived from the star wheel with the associated roller which as explained above, is intended to insure that each notch or step of the controller movement is distinctly felt by the operator. Those skilled in the art will readily realize that a compensator as described above is not limited in its usefulness to the specific type of controllers described in the specification, but is generally applicable to most of the other types of controllers wherein the resistance offered to the movement of the controller undergoes changes that are more or less irregular.

The star wheel for accentuating the steps of the controller movement and the compensating cam for equalizing the resistance offered to the moving of the controller, may be combined in a single unit by superimposing the notches of the star wheel upon the steps in the periphery of the cam surface. However, in the preferred construction, a separate star wheel and compensating cam are used.

The controller of the present invention is also distinguished by the organization of the several parts with a view to facilitating disassembly and inspection of one part of the mechanism without interfering with the other parts thereof. As seen in the drawings, the upper side of the main control shaft or spindle 4 is not journaled in the top cover plate 17 but in the partition wall or shelf 3. It is, accordingly, possible to remove the cover plate 17 after loosening the fastening screws 18 without in any way disturbing the mounting of the main control shaft 4 and the mechanisms associated therewith. As stated above, the mechanical parts of the controller, such as the star-wheel mechanism, compensating mechanism, operating mechanism for the second control shaft, and the interlocking mechanisms, are all disposed in the compartment of the controller chamber above the partition wall or shelf 3. On the other hand, all the electrical parts of the controller, such as the switches 32 and the cams for actuating the same, are disposed in the large compartment underneath the partition wall or shelf 3. Accordingly, upon removal of the cover plate 17 the operator finds free access to the mechanical parts of the controller and may readily proceed to inspect or adjust the same without being exposed to the danger of inadvertent contact with parts of the controller that are under voltage.

Figure 2:
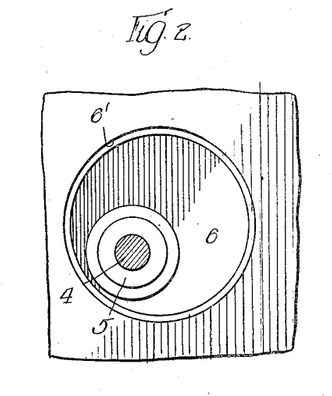
Fig. 2 is a top elevational view of the upper bearing support of the main controller shaft.

The special collar or supporting plate 6 for the upper spindle bearing 5 rests on a suitable shoulder 41 in the circular opening 6' of the partition wall 3. The diameter of said opening is larger than the diameter of the switching cams 31 so that the entire shaft with the column of cams mounted thereon may be readily withdrawn from the lower controller compartment by lifting the shaft with the bearing 5, bearing collar 6, as well as the cams mounted on shaft, through said opening without dismantling the other parts of the controller. In order to prevent rotation of the collar 6 within the opening in the partition wall 3 in which it is held, said collar is eccentric with respect to the shaft 4 and the shaft bearing 5, as seen in Fig. 2. This structure is simple and inexpensive to manufacture while providing for the ready removal of the complete control shaft with the control drum mounted thereon, and also preventing rotation of the collar when operating the handle.

Figure 3:
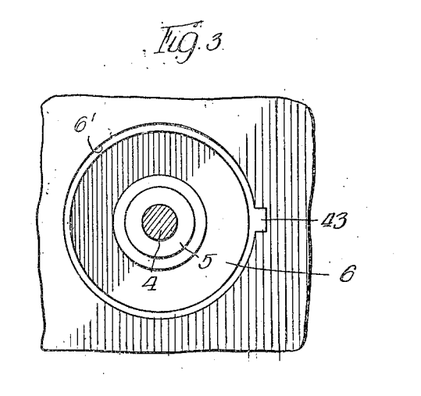
Fig. 3 is a view similar to Fig. 2, showing a modification of the bearing support.

An alternative mounting of the bearing collar is shown in Fig. 3, wherein rotation of the collar is prevented by a lug or key 43 locking the collar against movement in the partition wall 3 of the controller chamber.

The foregoing construction is particularly useful in controllers of great length requiring additional supports for the control shaft at points intermediate the end bearings thereof. In such case, a second partition wall 3' is provided at an intermediate point of the lower controller compartment, the second partition wall having, likewise, an opening 42 provided with a shoulder 43 on which is seated a second supporting collar 6' serving to hold an intermediate bearing 5' of the shaft. The diameter of the second collar 6' is somewhat smaller than that of the upper collar 6 so that the lower collar may be withdrawn through the opening of the upper collar. With such arrangement the complete control drum with the associated bearings and bearing supporting collars may be readily withdrawn through the top of the controller for repairs or replacements without taking apart the entire control mechanism. At the same time the entire long drum is firmly supported and journaled in the casing.

The construction of the switches 32 utilized in the controller and their design with a view to compactness as well as easy mounting and accessibility to the operating parts constitute distinct features of the present invention. The switches are of the unit type, all switches being alike to permit ready combinations and replacement thereof.

In the design of switches for controller service, or the like, it is important to secure high-current interrupting capacity with the parts of the switch so arranged as to permit ready mounting in a portion of the controller chamber at which the parts of the switch may conveniently be reached. In the preferred construction, utilized in high-voltage operation, the individual switches are provided with separate blow-out magnets for each switch element so that each arc is distinguished by a magnetic field induced by the current through the particular switch. In the prior-art constructions, the interrupting arc has been blown against a wall of fire-proof insulating material in order to quench the same. This requires that the arcing chamber, in which the arc is quenched, shall have a certain heat capacity; it must, in fact, be large enough to assure that the arc be positively broken within the chamber. Such prior-art constructions had the further drawback that the material of the chamber was constantly played on by the arc, becoming gradually disintegrated and necessitating frequent replacement.

Figure 7:
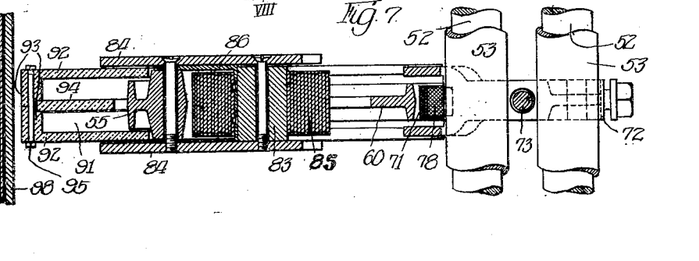
Fig. 7 is a sectional view through the switch unit along the line VII—VII of Fig. 6.

In the switch unit of the present invention the arcing chambers are, to a large degree, protected against such action of the arc by so disposing the contact members and the magnetic blow-out elements of the switch that the magnetic field tends to separate the striking points of the arc, or the arc terminals, without causing the crest of the arc to be repelled very far from the point where the arc was started. To this end, the switch contact members are so arranged that the outer conducting surfaces thereof constitute arcing horns that are inclined at an angle greater than 180 degrees, as distinguished from the usual constructions wherein the angle between the arcing horns is less than 180 degrees. With this construction, the two relatively movable poles or arms of the switch meet under an angle of approximately 90 degrees, fitting into a corner of the control chamber. The break or contact surface of two switch poles is preferably at the vertex of the angle, and the arc incident to the opening of the switch is blown outwardly away from the point of the break, the arc terminals being driven along the two outer sides of the switch poles away from the point of the break. The blow-out coil is preferably of rectangular shape conforming to the outer shape of the switch elements and is disposed within the angular space between the two switch arms. This switch construction is clearly illustrated in Figs. 6 to 8 of the drawing.

The individual switches are arranged in a vertical row adjacent to the cams 31 in one corner of the controller casing, and are supported on the two pairs of vertical supporting rods 51, 52 that are secured to the base plate 1 and to the partition wall 3, respectively. The supporting rods 51, 52 may be of iron and are covered with insulating tubes 53 to prevent short-circuiting the individual switches.

Each switch comprises a stationary switch member or pole 55 and a movable switch member or pole 56, said switch members or poles being of L-shape and complementing each other to form a substantially rectangular structure. One arm 57 and 58 of each L-shaped contact member, respectively, serves as a contact arm, the other pair of arms serving as supports 59 and 60, respectively, for said contact arms. The supporting arm 59 of the stationary switch member is secured to the pair of supporting rods 51 by means of a clamp 61 which also carries a screw terminal 62 serving as one terminal of the switch. The clamp 61 has no direct electrical connection with the supporting member 59 of the switch arm, the bolt 63 which holds said two members together being insulated from the clamp by a washer 64 and an insulating tube 65 surrounding the bolt. The movable switch member 56 has its supporting arm 60 pivotally mounted on a bracket 71 extending from a clamp 72 which is secured to the other pair of supporting rods 52 by a clamp bolt 73. A terminal screw 74 in the clamp serves as a second terminal connection for the switch.

The two contact arms 57 and 58 of the switch make break contact at the corner where they meet under the right angle. The tail end of the movable switch arm 16 carries a cam roller 75 arranged to engage the raised portion of the cooperating cam 31 in order to be moved in a direction at which the movable contact arm will break contact with the stationary contact arm. A coil spring 76 having one end supported at the base of the movable contact arm 58 and the other end at a lug 77 extending from the clamp member 72 serves to press the movable contact member against the stationary contact member to establish the contact thereupon. It is force exercised by said spring that has to be overcome when the raised portion of the cam 31 engages the cam roller 75 at the tail end of the movable switch arm. A conducting strip 78 is conductively clamped to the clamp 72 and movable arm 60 by means of bolts 79 in order to provide a good conducting path for the current in shunt to the spring 76 and the bracket 71.

The outer sides 81, 82 of the switch arms constitute the arc horn surfaces. It is along these surfaces that the terminals of the interrupting arc are blown backwardly away from the break point 83.

The blow-out action is obtained by means of a mechanism that is mounted within the open rectangle formed by the pole members 55 and 56 of the switch. It comprises a substantially rectangular blow-out coil 85 wound on an iron core 83 extending between two magnetic pole-shoe plates 84 disposed on both sides of the switch arms. The outer terminal 85 of the blow-out coil 81 is connected to the insulated terminal 62 of the switch, while the inner end of the coil is connected to the stationary contact member 55. The current to the stationary contact member flows thus from the terminal 62 by way of the blow-out coil 81 to the stationary contact member 57 of the switch, the current flowing in the coil serving to induce between the pole-shoe plates 84 the magnetic field for quenching the interrupting arc.

The magnetic field produced between the pole-shoe plates 84 is practically homogeneous and lies substantially perpendicular to the plane of the drawing. As a result, the terminals of the interrupting arc will be driven away from the striking points along the outer edges of the switch arms, constituting the above mentioned arc horns 81, 82 of the switch. The arc takes up successive positions as indicated by the dash-dotted lines 88. The pole-shoe plates 84 overlap only slightly the space bounded by the arc horn surfaces 81 and 82, and, accordingly, the crest of the arc will not be driven too far outwardly, the quenching action resulting principally from the lengthening of the arc because of the movement of the arc terminals along the two arc horn surfaces. These arc horn surfaces, as explained above, are inclined under an angle of 270 degrees, in distinction from the usual prior-art structures wherein the arcing horns enclose an angle of less than 180 degrees.

The foregoing construction renders it thus possible to economize in the space occupied by the switch by making, to a certain extent, use of the space inside of the interrupting arc. Or, looking in another way, in the improved switch construction, the blow-out field holds the crest of the arc substantially fixed in space and lengthens the arc until it reaches a state of unstability by drawing out the sides of the arc rather than the crest portion thereof.

In order to prevent burning and damage to the switch from the interrupting arc, the arcing space is enclosed by an arc tube 91 which is substantially L-shaped and serves to enclose the space between, and in front of, the two contact arms 57 and 58. The arc chute is made of refractory material adapted to resist the action of the arc, such as lavite or asbestos board, and comprises a pair of side plates 92 provided with inwardly-extending outer side walls 93 which serve to hold the two side plates 92 at the proper distance and also to provide an outer boundary beyond which the interrupting arc cannot be blown. In order to increase the quenching effect, the arcing chamber is sub-divided by one or more longitudinal partition walls 94 of a shape corresponding to the L-shaped space within the chute. These partitions are subjected to the heat of the arc more than any other parts of the arc chamber and require more frequent replacing. The arc chute of the present invention permits easy manufacture and assembly of the chute and easy replacing of the partition. To this end, the partition 94 is held between the outer walls 93 of the chute halves 92. The two halves are firmly held together by means of bolts 95 at the corners of the chute. By tightening the bolts 95 the partition wall 94 is firmly gripped and held in place. Loosening of the bolts 95 releases the partition wall, which may then be removed and replaced by another.

The side plates 92 of the arc chute fit between the pole plates 84 and the chute may be readily removed by simply withdrawing the same. The lower chute plate may be provided with a shoulder 96' abutting against the edge of the lower pole plate 84, in order to accurately align the chute with respect to the switch members. The arc chutes of the individual switches rest on the lower pole plates 84. When the several switches are assembled in a vertical pile and the arc chutes of the individual switches inserted in place, all the chutes may be locked and prevented from becoming loose by means of a lock rod 96 placed along the corner of the controller chamber and suitably secured to points on the base 1 and the partition wall 3. The arc chutes may also be held in place by means of suitable strips 97 of fire-proof material, such as asbestos, disposed at the portions of the cover 12 of the controller chamber adjacent to the sides of the chutes. The outer sides of the chute thus rest directly against the corner sides of the removable casing cover. With such arrangement the individual arc chutes are locked in place by simply fastening the cover 12 with the bolts 13. As soon as the cover is removed, the individual arc chutes may be withdrawn. Where the locking rod 96 is used in addition to the locking strips 97 in the cover 12, the locking rod 96 must also be removed before the individual arc chutes can be withdrawn from their places.

Figures 8, 9:
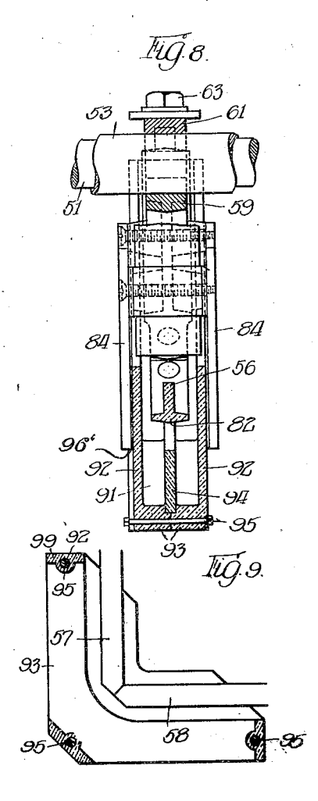
Fig. 8 is a sectional view of the switch along the line VIII—VIII in Fig. 6.
Fig. 9 is a horizontal sectional view of a modified form of arc chute for the switch of Fig. 6.

In the preferred construction the corner of the cover 12 facing the space opposite the switches is also lined with a layer 98 of fire-proof material, such as asbestos, said layer being suitably locked and held in place, as by means of the strips 97 referred to above. In this case, the individual arcing chambers need not have outer walls 93, but may be open at the sides, as shown in the modification of Fig. 9. The side plates of the chute are positioned in proper relationship with respect to each other by means of suitable inwardly-extending spacers at the corners of the chute.

By varying the shape of the partitions 93 the arc quenching characteristics of the chute may be changed and adapted to the particular operating conditions; for instance, the extent of the partitions inside the chamber may be varied.

In a controller having switches of the foregoing type the individual switch parts may be readily repaired, replaced and examined without interfering with, or taking apart, the remainder of the controller structure.

The procedure in case of a break-down is as follows: The protective casing 12 is removed giving access to the interior of the controller chamber. The individual arc chutes may thereupon be withdrawn from their places, as desired; the coil spring 76 may be removed by compressing and then withdrawing it; the bolt 73 which clamps the supporting bracket 72 may be loosened from the front side of the controller; and similarly the bolt 79, whereby the conducting shunt connection between the bracket 72 and the movable arm is established, may be reached from the front side of the controller. With these parts loosened, for instance by a screw driver, the whole moving part of any of the switches may be withdrawn. It is equally simple to replace any of the parts after remedying a defect. In general, the parts are so arranged that most of the bolts have their heads directed outwardly, in a direction perpendicular to the front wall of the controller so that they may be easily handled from the outside by a screw driver or other tool. The contact tips 59' at the abutting ends of the contact arms 57 and 58 are held in place by means of screws 60 which may be conveniently reached from the corner of the controller structure to permit ready replacing of worn-out contact tips.

If an immediate repair is not possible, the defective parts may be removed from the controller casing and the car run until it is returned, although the further operation is restricted to the range of control that is possible with the control elements that have not been withdrawn. In this way annoying interruptions in service may often be limited to relatively short periods and the inspection and repair or replacements of damaged parts of the controller can be undertaken by persons having little technical training.

The features of the invention described and pointed out above are not limited to the particular details of construction shown and described in order to exemplify the same, but many other modifications thereof will suggest themselves to those skilled in the art. Accordingly, it is desired that the appended claims shall be given a broad construction commensurate with the scope of the invention.

We claim as the invention:

1. A controller comprising a control member movable over a predetermined path to a plurality of control positions, a plurality of control elements actuated by said control member in said positions, the number of simultaneously actuated control elements varying for the different positions and the resistance offered to the movement of said control member being dependent on the number of simultaneously actuated control elements, and compensating means for equalizing the variations of the resistance opposing the movement of said control member to cause said resistance to be substantially the same irrespective of the number of elements actuated by said control member in said positions.

2. A controller comprising a control member movable over a predetermined path to a plurality of control positions, a plurality of control elements actuated by said control member in said positions, the number of simultaneously actuated control elements varying for the different positions and the resistance offered to the movement of said control member being dependent on the number of simultaneously actuated control elements, and means for compensating the variations of the resistance caused by the changes in the number of simultaneously actuated control elements to produce an arbitrarily predetermined characteristic in the resistance opposing the movement of said control member irrespective of the number of simultaneously actuated control elements.

3. A controller comprising a manually operated control member movable over a predetermined path between a plurality of control positions, a plurality of switch units actuated by said control member in said positions, the number of simultaneously actuated switch units varying for the different positions of said control member and the resistance offered to the movement of said control member varying with the number of simultaneously actuating switch units, and means for imparting to said resistance a predetermined characteristic irrespective of the number of simultaneously actuated switches, said means comprising a cam member having an irregularly shaped cam surface and a member bearing against said cam surface and exercising thereon a variable force having a predetermined relationship with respect to the number of simultaneously actuated switch units.

4. A controller comprising a control shaft, a manually operated handle for rotating said shaft between a plurality of predetermined angular control positions, a plurality of switch units actuated by said shaft during rotation thereof, said shaft actuating an irregularly varying number of switch units in the course of rotation thereof between the individual positions and requiring a similarly varying force to overcome the varying resistance offered by said switches against actuation thereof, and means compensating the variations of said resistance to cause the resistance offered to the rotation of said shaft to be substantially constant irrespective of the number of simultaneously actuated switch units.

5. A controller comprising a control shaft, a manually operated handle for rotating said shaft between a plurality of predetermined angular control positions, a plurality of switch units actuated by said shaft during rotation thereof, said shaft actuating an irregularly varying number of switch units in the course of rotation thereof between the individual positions and requiring a similarly varying force to overcome the varying resistance offered by said switches against actuation thereof, and means compensating the variations of said resistance to cause the resistance offered to the rotation of said shaft to be substantially constant irrespective of the number of simultaneously actuated switch units, said means comprising a cam member having an irregularly shaped cam surface and a relatively movable member pressing gainst said cam surface, the irregularities in said cam surface corresponding to the variations in the number of simultaneously actuated switches to compensate for the variations of the resistance offered the actuation of said switches.

6. A controller comprising a control shaft, a manually operated handle for rotating said shaft between a plurality of distinct angular control positions, a plurality of switch units actuated by said shaft during rotation thereof, the number of switch units simultaneously actuated by said shaft varying irregularly in the course of rotation thereof depending on the respective control positions and causing similar variations of the resistance offered to the movement of said control shaft and compensating means for equalizing the resistance offered to the rotation of said shaft, said means comprising a cam rotated by said shaft, and a friction member engaging the cam surface and bearing thereagainst, said cam surface being irregularly shaped to so vary the frictional resistance offered to the movement of said cam member as to offset the variations of the resistance offered to the actuation of said switches in the course of rotation of said shaft.

7. A controller comprising a control shaft, a handle for rotating said shaft to a plurality of distinct control positions, a plurality of switch units actuated by said shaft during rotation thereof, the number of switches simultaneously actuated by said shaft varying depending on the control position, said switch units offering a resistance to actuation thereof by said shaft and producing a variation of the total resistance offered to the rotation of said shaft, and compensating means comprising a cam rotated by said shaft, a friction member engaging said shaft, and a spring pressing said friction member against the surface of said cam, said cam surface being irregularly shaped to produce variations of the force pressing said friction member against the cam surface, said variations of the resistance opposing the movement of said cam complementing the variations of the resistance opposing the actuation of said switches to produce substantial equalization of the total resistance throughout the movement of said shaft between said control positions.

8. A controller comprising a control shaft, a manually operated handle for rotating said shaft between a plurality of distinct angular control positions, a plurality of switch units actuated by said shaft during rotation thereof, the number of switch units simultaneously actuated by said shaft varying irregularly in the course of rotation thereof depending on the respective control positions and causing similar variations of the resistance offered to the movement of said control shaft, compensating means for equalizing the resistance offered to the rotation of said shaft, said means comprising a cam rotated by said shaft, and a friction member engaging the cam surface and bearing thereagainst, said cam surface being irregularly shaped to so vary the frictional resistance offered to the movement of said cam member as to offset the variations of the resistance offered to the actuation of said switches in the course of rotation of said shaft, and an additional member for producing a predetermined variation of the resistance offered to the movement of the controller when passing predetermined positions.

9. A controller comprising a control shaft, a handle for rotating said shaft to a plurality of distinct control positions, a plurality of switch units actuated by said shaft during rotation thereof, the number of switches simultaneously actuated by said shaft varying depending on the control position, said switch units offering a resistance to actuation thereof by said shaft and producing a variation of the total resistance offered to the rotation of said shaft, compensating means comprising a cam rotated by said shaft, a friction member engaging said shaft, and a spring pressing said friction member against the surface of said cam, said cam surface being irregularly shaped to produce variations of the force pressing said friction member against the cam surface, said variations of the resistance opposing the movement of said cam complementing the variations of the resistance opposing the actuation of said switches to produce substantial equalization of the total resistance throughout the movement of said shaft between said control positions, and means for producing a predetermined decrease in the resistance offered to the movement of the controller upon passing predetermined control positions.

10. An electrical controller comprising a control shaft, a plurality of electrical control elements of greater width than said shaft mounted thereon, a casing enclosing said shaft and said control elements, a partition wall separating said casing into two compartments surrounding different portions of said shaft, the electrical control elements of said controller being disposed in one of said compartments and the mechanical control elements of said controller being disposed in another of said compartments, a bearing journaling said shaft in said partition wall, and a collar surrounding said bearing, said collar being axially loose but laterally locked in an opening in said partition wall to permit withdrawal but prevent rotation thereof, said opening being of sufficient width to permit said shaft with the control elements mounted thereon to be withdrawn through said opening.

11. An electric controller comprising a vertical controller casing having a base plate and a frame structure supported on said base plate, a partition wall secured to said frame structure below the upper wall of said casing, a cover plate secured above said partition wall, said partition wall dividing the space within said casing into two compartments disposed one above the other, a vertical shaft extending through said compartments and having means extending above said cover plate for manually rotating the same, a bearing in said partition wall journaling the upper end of said shaft, said bearing having a collar movably supported in an opening within said partition wall, a plurality of control elements of greater diameter than said shaft mounted thereon in the space below said partition wall, the opening in said partition wall being of such size as to permit withdrawal of said shaft with said control elements through said opening, and means for preventing rotation of said collar in said opening.

12. An electric controller comprising a vertical controller casing having a base plate and a frame structure supported on said base plate, a partition wall secured to said frame structure below the upper wall of said casing, a cover plate secured above said partition wall, said partition wall dividing the space within said casing into two compartments disposed one above the other, a vertical shaft extending through said compartments and having means extending above said cover plates for manually rotating the same, a bearing in said partition wall journaling the upper end of said shaft, said partition wall having a circular opening, a collar surrounding said bearing and removably supported in said opening, said collar being eccentric with respect to said shaft, a plurality of control elements of greater diameter than said shaft mounted thereon in the space below said partition wall, the opening in said partition wall being of such size as to permit withdrawal of said shaft with said control element through said opening.

13. An electric controller comprising a vertical controller casing having a base plate and a frame structure supported on said base plate, a partition wall secured to said frame structure below the upper wall of said casing, a cover plate secured above said partition wall, said partition wall dividing the space within said casing into two compartments disposed one above the other, a vertical shaft extending through said compartments and having means extending above said cover plate for manually rotating the same, a bearing in said partition wall journaling the upper end of said shaft, said bearing having a collar movably supported in an opening within said partition wall, a plurality of control elements of greater diameter than said shaft mounted thereon in the space below said partition wall, the opening in said partition wall being of such size as to permit withdrawal of said shaft with said control elements through said opening, and means for preventing rotation of said collar in said opening, the compartment above said partition wall containing mechanical actuating elements of said controller and the electrical elements of the control mechanism being confined in the compartment below said partition wall.

14. In control apparatus, a casing having a removable wall portion, switch units disposed within said casing, each switch unit comprising a pair of contact arms enclosing a substantially right angle, the contact surfaces of said arms being substantially at the vertex of said angle and disposed adjacent such casing portion, and a magnetic arc blow-out coil disposed in the angular space between said arms arc-chutes associated respectively with said units, said casing portion being common to said arc-chutes and providing for retention of the same in operative relation with respect to their associated switch units.

15. A control apparatus having a substantially rectangular casing, a column of similar switch units disposed one above the other in a corner of said casing, each switch unit comprising a pair of contact arms enclosing a substantially right angle, the contact surfaces of said arms being substantial at the vertex of said angle, and a magnetic arc blow-out coil disposed in the angular space between said arms, and means for causing the terminals of the interrupting arc to move away from the striking point at said vertex along the outer sides of said arms for elongating said arc and quenching the same.

16. A control apparatus comprising a control shaft and a plurality of similar switch units aligned along said shaft and actuated thereby, each switch unit comprising a pair of contact arms enclosing an angular space, the contact surfaces of said contact arms being disposed substantially at the corner of said angular space, a magnetic blow-out coil disposed in the angular space between said arms, and magnetic pole members for so directing the flux induced by said coil that the terminals of the interrupting arc incident to the opening of said contact members are moved away from the striking points at said vertex along the outer surfaces of said arms to elongate the sides of the arc and quench the same.

17. A control apparatus comprising a control shaft and a plurality of similar switch units aligned along said shaft and actuated thereby, each switch unit comprising a pair of contact arms enclosing an angular space, the contact surfaces of said contact arms being disposed substantially at the corner of said angular space, a magnetic blow-out coil disposed in the angular space between said arms, and magnetic pole members for so directing the flux induced by said coil that the terminals of the interrupting arc incident to the opening of said contact members are moved away from the striking points at said vertex along the outer surfaces of said arms to elongate the sides of the arc and quench the same, the portion of the field acting upon the crest of the arc opposite said vertex limiting the movement of said crest to a distance less than the distance of the movement of the arc terminals.

18. In a switch, a pair of contact arms disposed for relative movement into and out of engaging relation, and magnetic blow-out means operable upon movement of said arms out of such relation to render said arms effective as arc-horns.

19. A control apparatus having a switch comprising a pair of contact arms enclosing an angle of less than 180 degrees, the contact surface of said arms being at the vertex of said angle, a magnetic blow-out coil disposed in the space between said contact arms, and a pair of pole plates extending from said coil on both sides of said contact arms, the magnetic field induced by said coil between said pole plates causing the interrupting arc incident to the opening of the contact between said members to be quenched by driving the terminals of said arc along the outer sides of said arms away from the striking point at the vertex of said angle.

20. A control apparatus having a switch comprising a pair of contact arms enclosing an angle of less than 180 degrees, the contact surface of said arms being at the vertex of said angle, a magnetic blow-out coil disposed in the space between said contact arms, and a pair of pole plates extending from said coil on both sides of said contact arms, the magnetic field induced by said coil between said pole plates causing the interrupting arc incident to the opening of the contact between said members to be quenched by driving the terminals of said arc along the outer sides of said arms away from the striking point at the vertex of said angle, while causing the intermediate portion of said arc to be confined within a limited space in front of said contact arms.

21. A controller comprising a control shaft, a plurality of switch units mounted along said shaft and actuated thereby, each switch unit comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said contact arms to be quenched by driving the terminals of said arc along the outer sides of said arms away from the striking point at the vertex of said angle, a casing enclosing said shaft and said switch units, the contact points of said switch units being aligned along a corner of said casing.

22. A controller comprising a control shaft, a plurality of switch units mounted along said shaft and actuated thereby, each switch unit comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said contact arms to be quenched by driving the terminals of said arc along the outer sides of said arms away from the striking point at the vertex of said angle, a casing enclosing said shaft and said switch units, the contact points of said switch units being aligned along a corner of said casing, the portion of the casing opposite said switches being removable to expose the same without interfering with the operativeness of said controller.

23. A controller comprising a control shaft, a plurality of switch units mounted along said shaft and actuated thereby, each switch unit comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said contact arms to be quenched by driving the terminals of said arc along the outer sides of said arms away from the striking point at the vertex of said angle, a casing enclosing said shaft and said switch units, the contact points of said switch units being aligned along a corner of said casing, and arc chutes enclosing the arcing spaces of the individual switches, each arc chute being held loosely on the associated switch and laterally removable therefrom, and a locking rod for simultaneously locking a plurality of said chutes in place within the individual switches.

24. A controller comprising a control shaft, a plurality of switch units mounted along said shaft and actuated thereby, each switch unit comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said contact arms to be quenched by driving the terminals of said arc along the outer sides of said arms away from the striking point at the vertex of said angle, a casing enclosing said shaft and said switch units, the contact points of said switch units being aligned along a corner of said casing, arc chutes enclosing the arcing spaces of the individual switches, each arc chute being held loosely on the associated switch and laterally removable therefrom, and means for causing said chutes to be locked or unlocked in their places by locking and unlocking the removable cover of said control casing.

25. A control apparatus having a switch comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said members to be quenched by driving the terminals of said arc along the outer sides of said arms away from the striking point at the vertex of said angle, and an arc chute for confining the interrupting arc, said arc chute enclosing a substantially L-shaped space in front of the outer sides of said contact arms.

26. A control appartus having a switch comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said members to be quenched by driving the terminals of said arc along the outer sides of said arms away from the striking point at the vertex of said angle, and an arc chute for confining the interrupting arc, said arc chute constituting a substantially closed L-shaped chamber having two arms enclosing an angle similar to that of the contact arms and disposed in front of the outer sides of the same.

27. A controller comprising a control shaft, a plurality of switch units mounted along said shaft and actuated thereby, each switch unit comprising a pair of contact arms enclosing an angle of less than 180 degrees, the contact surface of said arms being at the vertex of said angle, a magnetic blow-out coil disposed in the space between said contact arms, a pair of pole plates extending from said coil on both sides of said contact arms, the magnetic field induced by said coil between said pole plates causing the interrupting arc incident to the opening of the contact between said contact arms to be quenched by driving the terminals of said arc along the outer sides of said arms away from the striking point at the vertex of said angle, and an arc chute for confining the interrupting arc, said arc chute enclosing a substantially L-shaped space in front of the outer sides of said contact arms, and a casing having a removable casing cover enclosing the space around said switches, the outer sides of said arc chutes resting against a corner of said cover.

28. In a control apparatus, a plurality of rectangularly shaped switches aligned with respect to each other, each switch comprising a pair of co-operating L-shaped switch members, each switch member comprising a contact arm and a supporting arm, said contact arms having co-operating contact surfaces engaging each other at the corner of the rectangle formed by said switch members, one of said members being pivotally mounted at an intermediate point of its supporting arm, a compression spring acting back of the contact arm of the movable switch member to hold the same in closed position, and a rotatable cam acting against a protruding portion of the pivoted supporting arm to cause said movable member to break contact against the action of said spring.

29. In a control apparatus, a plurality of rectangularly shaped switches aligned one above the other, each switch comprising a pair of co-operating L-shaped switch members, each switch member comprising a contact arm and a supporting arm, said contact arms having co-operating contact surfaces engaging each other at the corner of the rectangle formed by said switch members, one of said members being pivotally mounted at an intermediate point of its supporting arm, a compression spring acting back of the contact arm of the movable switch member to hold the same in closed position, a rotatable cam acting against a protruding portion of the pivoted supporting arm to cause said movable member to break contact against the action of said spring, a supporting rod disposed transversely to the plane of said switch, and a clamping member for pivotally supporting the movable arm of said switch, said compression spring being anchored on said clamping member.

30. In a control apparatus, a plurality of rectangularly shaped switches aligned one above the other, a casing enclosing said switches, said casing having a removable cover, each switch comprising a pair of co-operating L-shaped switch members, each switch member comprising a contact arm and a supporting arm, said contact arms having co-operating contact surfaces engaging each other at the corner of the rectangle formed by said switch members, one of said members being pivotally mounted at an intermediate point of its supporting arm, a compression spring acting back of the contact arm of the movable switch member to hold the same in closed position, a rotatable cam acting against a protruding portion of the pivoted supporting arm to cause said movable member to break contact against the action of said spring, a supporting rod disposed transversely to the plane of said switch, and a clamping member for pivotally supporting the movable arm of said switch, said compression spring being anchored on said clamping member, said compression spring and the contact member actuated thereby being disposed directly back of the removable cover of said casing.

31. A control apparatus comprising a switch having a pair of co-operating contact members, an arc chute for confining the arc incident to the opening of said contact members, said arc chute comprising two side walls on both sides of said contact members, and a partition wall longitudinally sub-dividing the space between said side walls, said partition wall being held clamped between inward extensions of said side walls.

32. A control apparatus comprising a switch having a pair of co-operating contact arms enclosing a substantially right angle, the contact surface of said arms being at the vertex of said angle, means for causing the interrupting arc to move in the space outside said arms, an arc chute for confining said arc and enclosing a substantially L-shaped space in front of the outer sides of said arms, said chute comprising a pair of side plates having inwardly extending wall portions to hold said side plates in spaced relationship and enclosing the outer sides of said chamber against which the arc is moved, said chamber having a partition longitudinally sub-dividing the arc space and having an inner edge extending toward said contact arms, the outer edges of said partition being locked in place by the inward extensions of said side plates.

33. In switch apparatus, arc-horn members angularly disposed with respect to each other with the respective arc-horn surfaces angularly related by substantially 270 degrees, contact tips carried by said members at certain of the ends thereof, means supporting said members for relative movement in such wise as to effect movement of said tips into and out of engaging relation with each other, and means associated with said apparatus and being operable upon movement of said tips out of such relation to render said arc-horn members effective with respect to the occurring interrupting arc at the disengaging contact tips.

34. In switch apparatus, an operating shaft supported for rotary movement about its longitudinal axis, means for imparting such movement to said shaft, spring means operable to resist such movement, and means operable with said shaft and co-operable with said spring means to regulate such resisting action thereof.

35. In switch apparatus, an operating shaft supported for adjusting movement about its longitudinal axis, means operable to yieldingly retain said shaft in its various positions of adjustment, means for imparting such movement to said shaft, means operable independently of said retaining means to resist such movement, and means operable at different predetermined positions of said shaft to vary the resisting action of said resisting means.

In testimony whereof we have hereunto subscribed our names this 15th day of March, A. D. 1927, at Zurich, Switzerland.

KARL KUNTZE.
ARNOLD HALLER.
ERNST WIRZ.